Mori

[15] 3,690,769
[45] Sept. 12, 1972

[54] ENDOSCOPE WITH BUILT-IN OXIMETER

[72] Inventor: Toshiyuki Mori, Tokyo, Japan

[73] Assignee: Olympus Optical Co., Ltd., Tokyo, Japan

[22] Filed: Dec. 7, 1970

[21] Appl. No.: 95,479

[30] Foreign Application Priority Data

Dec. 12, 1969 Japan ..................44/100359
Dec. 12, 1969 Japan ..................44/118626
Dec. 12, 1969 Japan ..................44/118627

[52] U.S. Cl. ..................................................356/41
[51] Int. Cl. ...............................................G01n 33/16
[58] Field of Search ..........................356/39–41, 219

[56] References Cited

UNITED STATES PATENTS

| | | | |
|---|---|---|---|
| 3,123,066 | 3/1964 | Brumley | 356/41 X |
| 3,461,856 | 8/1969 | Polanyi | 356/41 X |
| 3,136,310 | 6/1964 | Meltzer | 356/41 X |
| 3,177,762 | 4/1965 | Ito | 356/219 |
| 3,591,297 | 7/1971 | Hagner | 356/219 |
| 3,068,739 | 12/1962 | Hicks, Jr. et al. | 356/41 X |
| 3,068,742 | 12/1962 | Hicks, Jr. et al. | 356/41 |
| 3,511,227 | 5/1970 | Johnson | 356/41 UX |

*Primary Examiner*—Ronald L. Wibert
*Assistant Examiner*—V. P. McGraw
*Attorney*—Kelman and Berman

[57] ABSTRACT

An endoscope is provided with an inflatable, transparent bag enveloping the objective in the forward end portion and capable of being inflated by air from the control housing. The light reflected from the patient's blood through the bag into the objective and transmitted by a bundle of optical fibers to the control housing is analyzed for its content of red and infrared radiation as a measure of the oxygenation of the blood, the analysis apparatus being connected either to the eyepiece in the control housing or to a separate outlet receiving a portion of the image forming light through a beam splitter so that visual inspection of an internal organ can be performed alternatingly or simultaneously with the oximetric analysis.

3 Claims, 3 Drawing Figures

Patented Sept. 12, 1972

3,690,769

INVENTOR

ENDOSCOPE WITH BUILT-IN OXIMETER

BACKGROUND OF THE INVENTION

This invention relates to an oximeter and, more particularly, to an oximeter used with an endoscope.

An endoscope permits the direct observation of the internal organ of a living body by inserting the forward end portion of the endoscope into the internal organ to be inspected.

It is an object of this invention to incorporate an oximeter in the endoscope to measure the degree of saturation of oxygen in the arterial blood while the endoscope is operated to observe the internal organ.

SUMMARY OF THE INVENTION

In accordance with the present invention, a transparent balloon-shaped bag made of synthetic resin film is inflatably attached to the forward end portion of the endoscope and a detecting element is located behind the eyepiece of the endoscope or behind a beamsplitter located behind the rear end of the image transmitting fiber optical system. Thus, when the forward end portion of the endoscope is inserted in a blood vessel or in the heart and the transparent bag attached to the forward end portion is inflated by introducing air into the bag through an air conducting tube extending through the elongated tube of the endoscope from the control housing, the light issuing from the illuminating fiber optical system of the endoscope is directed to the blood through the transparent bag and reflected therefrom to the image transmitting fiber optical system so that the degree of saturation of oxygen in the arterial blood may be measured by alternately locating a red filter and an infrared filter in the optical path as is well known itself.

Detailed Description of the Preferred Embodiments

Figure 1:
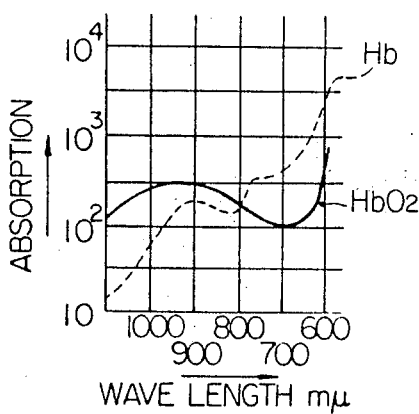
FIG. 1 is a diagram showing the absorption spectrum hemoglobin an oxygenated hemoglobin.

Referring to FIG. 1, the absorption of light by hemoglobin (Hb) seen to be great at wave lengths of 600 – 750 m$\mu$ in comparison with the absorption of light by oxygenated hemoglobin (HbO$_2$) while the absorption of light by Hb is substantially equal to that by HbO$_2$ at about 800 m$\mu$.

Figure 2:
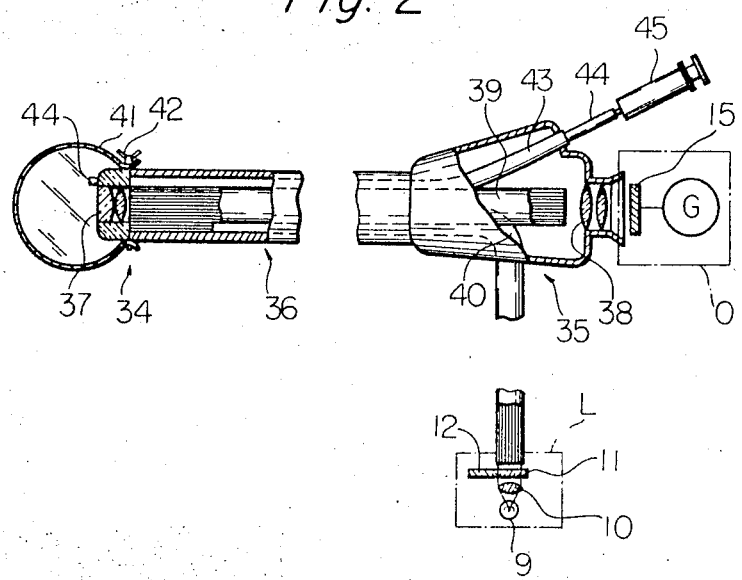
FIG. 2 is a sectional elevational view of an oximeter incorporated in an endoscope according to this invention.
Figure 3:
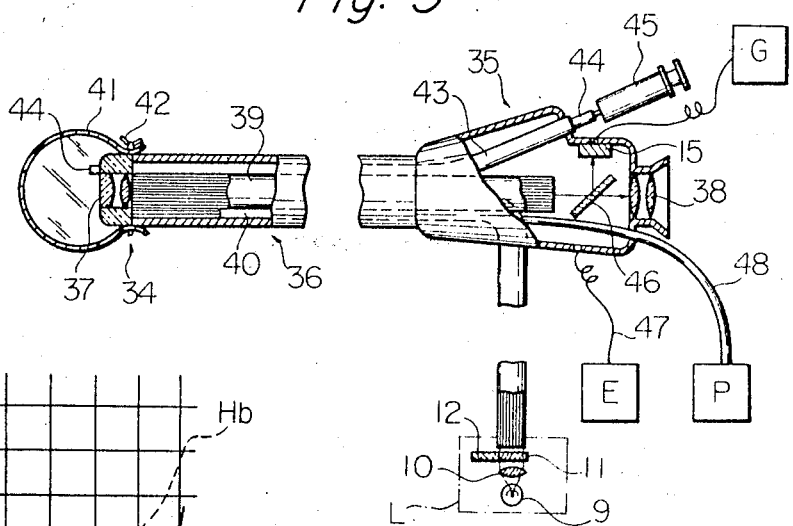
FIG. 3 is a view similar to FIG. 2 but showing an alternative form of the apparatus.

FIG. 3 shows an embodiment of the present invention in which an oximeter is incorporated in an endoscope.

The endoscope comprises a forward end portion 34 adapted to be inserted into the blood vessel or the heart for the inspection thereof and and a control housing 35 connected through an elongated flexible tube 36. An objective 37 is located in the forward end portion 34 and an image transmitting fiber optical system 39 extends through the elongated flexible tube 36 with the forward end located behind the objective 37 so as to form an image of the object on the forward end surface of the image transmitting fiber optical system 39 by means of the objective while the rear end terminates in the control housing 35. An eyepiece 38 is located behind the rear end of the image transmitting fiber optical system 39 so that the image of the object transmitted through the image transmitting fiber optical system 39 to the rear end surface thereof is viewed through the eyepiece 38. In order to illuminate the object, an illuminating fiber optical system 40 extends through the elongated flexible tube 36 with the forward end thereof terminating at a window in the forward end of the forward end portion 34 while the rear end extends beyond the control housing and is connected to a light source L so that the light from the light source L is supplied to the illuminating fiber optical system 40 and radiated from the distal end thereof so as to illuminate the object.

In accordance with the present invention, an inflatable transparent bag 41 in the shape of a balloon which is made of a thin transparent film such as a pliable synthetic resin film is attached to the forward end portion 34 by means of tightening thread 42 and the like and an air conducting tube 44 connected to an air supplying device 45 at its proximal end is inserted through a channel 43 extending through the elongated flexible tube 36 from the control housing 35 to the forward end portion 34 so that air is introduced into the bag 41 through the air conducting tube 44 to inflate the same. The light source L is provided with a lamp 9, a condenser 10, a red filter 11 and an IR filter 12 alternately positionable in the optical path of the light source L in a manner known in itself. A detecting device 0 is detachably mounted on the eyepiece 38 and comprises a photoelectric element 15 and a galvanometer G connected to the photoelectric element 15.

In operation, the bag 41 is inflated by air introduced through the air conducting tube 44 by the operation of the air supplying device 45 after the forward end portion 34 of the endoscope has been inserted into the internal organ of a living body desired to be inspected. The air conducting tube 44 may be inserted through the channel 43 prior to or after the insertion of the forward end portion 34 into the internal organ. When the bag 41 is inflated a clear field of view is provided by the inflated bag.

In order to measure the degree of saturation of oxygen in the blood, the detecting device 0 is attached to the eyepiece 38 and the filter 11 and the filter 12 are alternately located in the optical path of the condenser 10 so as to measure the light absorption by the blood.

Thus, the endoscope is also used as an oximeter.

FIG. 3 shows a modification of the afore-described apparatus in which embodiment of FIG. 11 a beamsplitter 46 such as a semi-transparent mirror or prism is located in the optical path between the rear end of the image transmitting fiber optical system 39 and the eyepiece 38 and the photoelectric element 15 of the detecting device is permanently located in the control housing in the path of the deflected light portion so that the measurement of the degree of saturation of oxygen in the blood can be carried out while the object is being observed.

The device of FIG. 3 may be provided with a cardiopulmonary function tester such as an electrocardiograph E having its measuring branch 19 extending through the elongated tube 36 to the forward end portion 34, and a sphygmomanometer P having its catheter-shaped measuring branch 48 extending through the elongated tube 36 to the forward end portion 34. Thus, an electrocardiogram and a blood pressure reading can be obtained by the endoscope of FIG. 3 in addition to the observation of the object and the measurement of the degree of saturation of oxygen in the blood.

I claim

1. An oximeter comprising, in combination:
   a. an elongated flexible tube having an open front end and a rear end;
   b. two light conducting optical systems extending longitudinally in said tube and having respective front and rear end portions adjacent the corresponding ends of said tube;
   c. a light source communicating with the rear end portion of one of said systems, whereby light from said source may be radiated from the front end portion of said one system through said open front end;
   d. an objective in said front end in optical alignment with the front end portion of the other system;
   e. an eyepiece in said rear end in optical alignment with the rear end portion of said other system;
   f. a bag of pliable, transparent material secured to said front end;
   g. inflating means on said rear end communicating with said bag for inflating the same to a position in which said objective is enclosed by the inflated bag;
   h. detecting means for detecting light received by said rear end portion of said other system and for generating a signal indicative of the intensity of the detected light; and
   i. filter means for limiting the detected light to selected wave lengths in the red and infrared parts of the spectrum.

2. An oximeter as set forth in claim 1, further comprising a galvanometer, and beam splitter means interposed between said rear end portion of said other system, said eyepiece, and said detecting means for dividing the light received by said rear end portion, and for transmitting respective parts of the divided light to said eyepiece and to said detecting means, said detecting means including a photoelectric element connected to said galvanometer.

3. An oximeter as set forth in claim 1, wherein said inflating means include a source of gas on said rear end, and an air conducting tube extending in said elongated flexible tube from said rear end to said bag.

* * * * *